Nov. 15, 1927.

F. R. PORTER 1,649,486

INTERNAL COMBUSTION ENGINE

Filed Nov. 25, 1924

INVENTOR

Finley R. Porter

BY

ATTORNEYS

Patented Nov. 15, 1927.

1,649,486

UNITED STATES PATENT OFFICE.

FINLEY R. PORTER, OF NEW YORK, N. Y., ASSIGNOR TO PORTER ENGINE DEVELOPMENT, INC., OF NEW YORK, N. Y., A CORPORATION OF NEW YORK.

INTERNAL-COMBUSTION ENGINE.

Application filed November 25, 1924. Serial No. 752,154.

My invention relates to internal combustion engines and is shown in connection with an internal combustion engine of the rotary valve type in which the cylinder has a common inlet and discharge port, the valve chest has separate inlet and discharge ports and the valve has a peripheral bridge port located in the same plane as the cylinder and valve chest ports.

The object of my invention is to provide a novel packing engaging the valve around the cylinder port for preventing leakage, for ensuring proper lubrication of the parts, for cooling the parts and for providing sufficient pressure of the sealing ring on the valve to obtain a gas tight engagement without too much friction.

A practical embodiment of my invention is represented in the accompanying drawings, in which Fig. 1 represents a vertical cross section through so much of an internal combustion engine of the rotary valve type as includes my invention.

Figure 1:
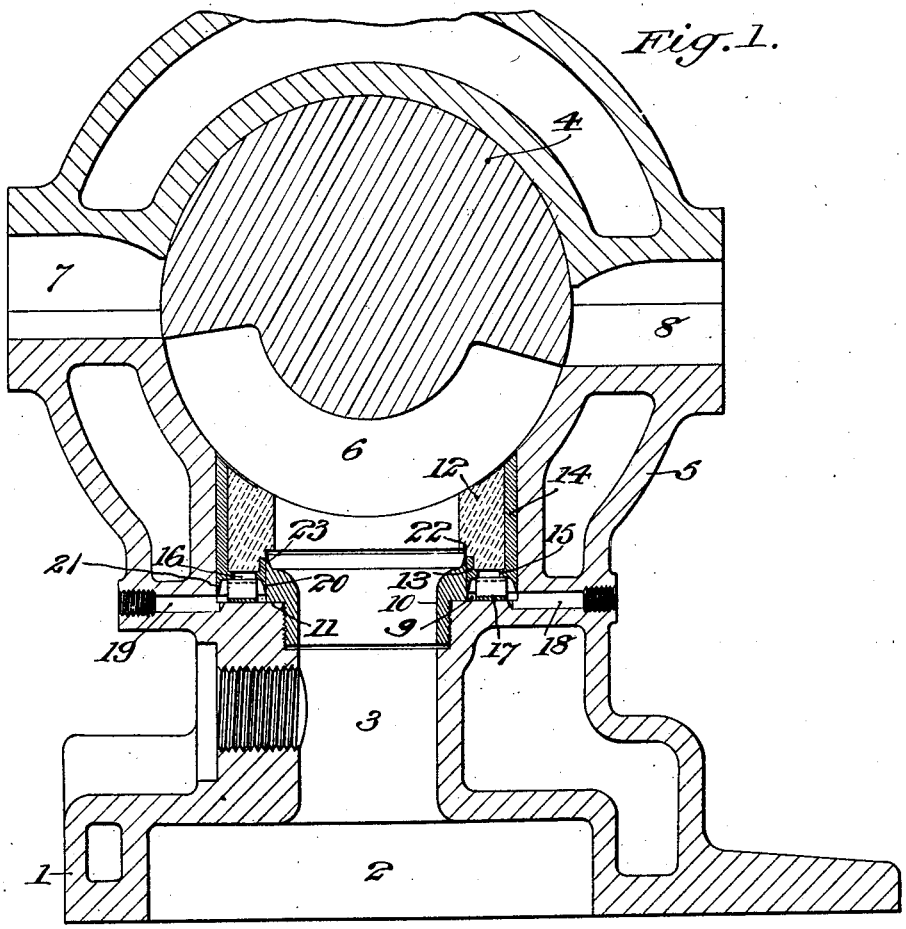
Figure 2:
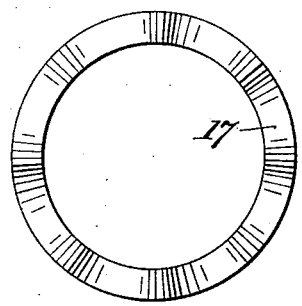
Fig. 2 represents a plan view of the packing advancing spring.
Figure 3:
Fig. 3 represents an edge view of the same.
Figure 4:
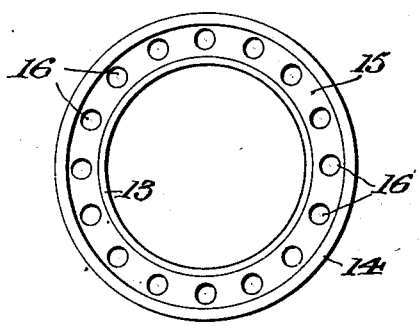
Fig. 4 represents a plan view of the cylinder ring holder.

The cylinder is denoted by 1, the combustion chamber by 2 and the cylinder port by 3. The valve 4 is rotatably mounted in the valve chest 5, which rotary valve is provided with a peripheral bridge port 6. The valve chest is provided with a motive fluid inlet port 7 and an exhaust port 8 leading, respectively, to and from the face of the rotary valve 4. The ports 3, 6, 7 and 8 are all located in the same plane.

The cylinder 1 is provided with an annular packing chamber 9 surrounding the port 3 and opening to the face of the rotary valve 4. A cylinder ring 10 projects into the packing chamber 9 and is screwed into the walls of the cylinder port, the bore of which ring forms a continuation of said port. This cylinder ring 10 is provided with an external circumferential shoulder 11 at the base of its screw-threaded portion.

Within the packing chamber 9 I locate a packing which surrounds the cylinder port. This packing is herein shown as comprising a sealing ring 12 of oil impregnated self-lubricating bearing material such, for instance, as "genalite" and a holder therefor having an inner side wall 13, an outer side wall 14 and a perforated bottom 15, the holes 16 of which open communication between the space at the bottom of the packing chamber 9 and the bottom of the sealing ring 12.

I employ spring means for advancing the packing to hold the sealing ring 10 against the face of the valve with the desired pressure, which spring means is herein shown as a radially corrugated spring washer 17 located in the space between the bottom of the packing chamber 9 and the bottom of the sealing ring holder.

I provide means for circulating lubricating oil through the space between the bottom of the sealing ring holder and the bottom of the packing chamber so that not only may oil be constantly fed through the holes 16 to the sealing ring 12 to be absorbed thereby as required but also for cooling the packing and the adjacent parts sufficiently to prevent their becoming over-heated. This is provided for by the oil inlet passage 18 and oil outlet passage 19 leading, respectively, to and from the packing chamber and preferably arranged at points diametrically opposed.

To prevent leakage of the oil past the packing, the inner and outer lower walls of the sealing ring holder are beveled to form thin resilient lips 20 and 21 snugly engaging, respectively, the inner and outer walls of the packing chamber, which lips are preferably sprung sufficiently to ensure a tight fit.

To counteract to the required degree the tendency of the gas pressure to force the sealing ring away from the face of the valve, the bore of the sealing ring is provided with an internal annular shoulder 22 overlapping the upper end of the cylinder ring and the bore of the cylinder ring 10 is flared upwardly to a point opposite the shoulder 22, preferably forming a thin resilient lip 23 snugly engaging the packing to prevent leakage of the gas past the same into the oil space. It will be seen that this flaring bore of the cylinder ring permits upward pressure to be exerted by the gas upon the shoulder 22 of the sealing ring, tending to force the sealing ring toward the face of the valve.

From the above description it will be seen that by flaring the bore in the cylinder ring and by providing the bore of the packing with an annular shoulder overlapping said flaring bore, I am enabled to cause the gas pressure within the cylinder port to exert force on the packing to press it against the face of the valve, spring means at the same time being employed to hold the packing against the valve, and means also being provided for cooling the parts by circulating oil through the packing chamber, said packing having a sealing ring of self-lubricating bearing material in open communication with the oil whereby the sealing ring may be kept oil impregnated. Also the packing advancing spring washer is immersed in the oil in the packing chamber, thereby increasing its life and efficiency.

It is evident that various changes may be resorted to in the construction, form and arrangement of the several parts without departing from the spirit and scope of my invention; hence, I do not wish to limit myself to the particular embodiment herein shown and described, but

What I claim is:—

1. In an internal combustion engine, a rotary valve, a cylinder having a port and a chamber surrounding it, a packing including a sealing ring of oil impregnated self-lubricating bearing material in said chamber having an inner annular shoulder subject to gas pressure within said port, tending to force the packing toward the valve, spring means for holding the packing against the valve, and means for circulating oil through said chamber in contact with said sealing ring at a distance from the face of the valve for supplying oil to the sealing ring and for cooling the parts.

2. In an internal combustion engine, a rotary valve, a cylinder having a port and a chamber surrounding it, a packing around said port within said chamber including a sealing ring of oil impregnated self-lubricating bearing material and a perforated holder therefor, said sealing ring having an inner annular shoulder subject to gas pressure within said port, tending to force the packing toward the valve, and spring means for holding the packing against the valve.

3. In an internal combustion engine, a rotary valve, a cylinder having a port and a chamber surrounding it, a packing around said port within said chamber including a sealing ring of oil impregnated self-lubricating bearing material and a perforated holder therefor, said sealing ring having an inner annular shoulder subject to gas pressure within said port, tending to force the packing toward the valve, spring means for holding the packing against the valve, and means for circulating oil in said chamber for supplying oil to the sealing ring through said perforated holder and for cooling the parts.

4. In an internal combustion engine, a rotary valve, a cylinder having a port and a chamber surrounding it, a packing around said port within said chamber including a sealing ring of oil impregnated self-lubricating bearing material and a perforated holder therefor, said sealing ring having an inner annular shoulder subject to gas pressure within said port, tending to force the packing toward the valve, spring means for holding the packing against the valve, means for circulating oil in said chamber for supplying oil to the sealing ring through said perforated holder and for cooling the parts, said holder being provided with resilient means frictionally engaging the side walls of the chamber for preventing leakage thereby.

5. In an internal combustion engine, a rotary valve, a cylinder having a port and a chamber surrounding it, a cylinder ring forming the inner wall of said chamber, a packing within said chamber, said packing having an inner annular shoulder and said cylinder ring having an upwardly flaring bore whereby the shoulder may be subjected to gas pressure, tending to force the packing toward the valve, and spring means for holding the packing against the valve.

6. In an internal combustion engine, a rotary valve, a cylinder having a port and a chamber surrounding it, a cylinder ring forming the inner wall of said chamber, a packing within said chamber, said packing having an inner annular shoulder and said cylinder ring having an upwardly flaring bore whereby the shoulder may be subjected to gas pressure, tending to force the packing toward the valve, spring means for holding the packing against the valve, and means for circulating oil through said chamber in contact with said packing for supplying oil thereto and for cooling the parts.

7. In an internal combustion engine, a rotary valve, a cylinder having a port and a chamber surrounding it, a cylinder ring forming the inner wall of said chamber, a packing within said chamber, said packing having an inner annular shoulder and said cylinder ring having an upwardly flaring bore whereby the shoulder may be subjected to gas pressure, tending to force the packing toward the valve, spring means for holding the packing against the valve, means for circulating oil through said chamber in contact with said packing for supplying oil thereto and for cooling the parts, said packing being provided with resilient means engaging the side walls of the chamber for preventing leakage thereby.

In testimony, that I claim the foregoing as my invention, I have signed my name this 21st day of November 1924.

FINLEY R. PORTER.